United States Patent
Yamada et al.

(10) Patent No.: US 7,134,032 B2
(45) Date of Patent: Nov. 7, 2006

(54) METHOD AND APPARATUS FOR CHANGING POWER MODES BASED ON MONITORED I/O PACKETS

(75) Inventors: Hiroshi Yamada, Kawasaki (JP); Shinichi Yoshimoto, Kawasaki (JP); Yasushi Hara, Kawasaki (JP); Akira Shiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 538 days.

(21) Appl. No.: 09/809,106

(22) Filed: Mar. 16, 2001

(65) Prior Publication Data

US 2001/0044332 A1    Nov. 22, 2001

(30) Foreign Application Priority Data

May 19, 2000  (JP)  ............................. 2000-147907

(51) Int. Cl.
*G06F 1/26* (2006.01)
*G06F 1/32* (2006.01)

(52) U.S. Cl. ...................... 713/324; 713/300; 713/320; 713/322; 713/323

(58) Field of Classification Search ................ 713/300, 713/320, 322, 323, 324, 330, 340
See application file for complete search history.

(56) References Cited

U.S. PATENT DOCUMENTS

| | | | | |
|---|---|---|---|---|
| 5,287,292 A | * | 2/1994 | Kenny et al. | 713/501 |
| 5,483,656 A | * | 1/1996 | Oprescu et al. | 713/320 |
| 5,546,591 A | * | 8/1996 | Wurzburg et al. | 713/322 |
| 5,557,551 A | * | 9/1996 | Craft | 713/321 |
| 5,576,738 A | * | 11/1996 | Anwyl et al. | 713/321 |
| 5,623,647 A | * | 4/1997 | Maitra | 713/501 |
| 5,715,467 A | * | 2/1998 | Jirgal | 713/300 |
| 5,809,303 A | * | 9/1998 | Senator | 719/325 |
| 5,838,891 A | * | 11/1998 | Mizuno et al. | 714/5 |
| 5,940,785 A | * | 8/1999 | Georgiou et al. | 713/322 |
| 5,954,820 A | * | 9/1999 | Hetzler | 713/323 |
| 5,964,879 A | * | 10/1999 | Dunstan et al. | 713/340 |
| 5,999,197 A | * | 12/1999 | Satoh et al. | 713/500 |
| 6,158,012 A | * | 12/2000 | Watts, Jr. | 713/322 |
| 6,535,798 B1 | * | 3/2003 | Bhatia et al. | 713/340 |

FOREIGN PATENT DOCUMENTS

JP    11296266 A    * 10/1999

* cited by examiner

*Primary Examiner*—James K. Trujillo
(74) *Attorney, Agent, or Firm*—Westerman, Hattori, Daniels & Adrian, LLP.

(57) ABSTRACT

A portable information device, a power saving mode switching method, and a recording medium in which a power saving mode switching program is stored, for efficiently suppressing power generation peaks. In an information device having a component (1) such as a processor and a component (2) such as a magnetic disk device, it is detected whether it is the peak power generation condition or the peak power completion condition on the basis of access information to the component (2), and a power mode change request is given to a power mode changing means (4); and the power mode changing means (4) changes over the component (1) such as the processor from a normal power mode to a power saving mode where the operating voltage is reduced, the clock frequency is reduced, or the like when the peak power generation condition is detected, and changes over it from the power saving mode to the normal power mode when the peak power completion condition is detected.

8 Claims, 7 Drawing Sheets

METHOD AND APPARATUS FOR CHANGING POWER MODES BASED ON MONITORED I/O PACKETS

BACKGROUND OF THE INVENTION

1. Technical Field

The present invention relates to power-consumption-reducing portable or stationary information devices; to a power-saving-mode switching method for reducing information device power consumption; and to a recording medium, such as a magnetic disk, an optical disk or semiconductor memory, in which a power-saving-mode switching program is stored.

2. Description of Related Art

In various electronic devices, there have been proposed various power control means for reducing the power consumption. Also, there has been known various power control means which supply the operating power to the electronic device without increasing the current capacity of a power supply by the suppression of a peak current. In particular, in the portable information device in which the power supply that supplies the operating power is comprised of a battery, in order to downsize and lighten the battery, or in order to elongate a continuous applicable duration of the battery, there have been proposed various structures including the power saving control function.

For example, FIG. 6 shows a schematic functional block diagram of a conventional example. A power mode control means 61 controls a power mode changing means 62 in accordance with a device use request, an interruption from a timer portion 65 at each set time, a temperature detection signal from the temperature detecting means 64, or the like, and changes over a voltage, a clock frequency or the like which is supplied to a component 63a such as a processor between a normal power mode and a low power consumption mode.

For example, in response to a request for using a device or the like, the power mode control means 61 controls the power mode changing means 62 and supplies a normal operating voltage and a clock signal of a normal clock frequency to the component 63a such as a processor so as to operate the component 63a as the normal power mode. Then, if there is no use request for a predetermined period of time or longer, any one or both of the supply voltage and the clock frequency are lowered, or the clock signal is stopped to set the mode to the low power consumption mode.

Further, the temperature of a component 63b such as a magnetic disk is detected by the temperature detecting means 64, and if the operating temperature rises over a set temperature, the power mode control means 61 controls the power mode changing means 62 and sets the component 63a such as a processor to the low power consumption mode, to thereby reduce the access frequency to the component 63b, thus suppressing the rise of the temperature.

Moreover, the timer portion 65 notifies the power mode control means 61 every set time and controls the power mode changing means 62 so as to change over between the low power consumption mode and the normal power mode. For example, as applied to portable telephones and the like, in a standby state where talking or data transmission/reception is not conducted, the mode can be changed over to the low power consumption mode, and can be changed over to the normal power mode which enables the reception detection, the position registration request and the like every set time by the timer portion 65.

In general, the power consumption in the low power consumption mode such as a standby state is under half the power consumption in the normal power mode where the device is in an active state. Accordingly, as the duration of the low power consumption mode is longer, the power consumption as a whole can be reduced. Further, as the storage device of the information device, a large-capacity storage device such as a magnetic disk device, a magneto-optical disk device or an optical disk device is applied. In addition, in order to improve the data transmission speed, a tendency is made to increase the rpm of a disk. Therefore, the capacity of a motor is also increased, and a start current is also increased for conducting a high-speed start.

Further, there has been known a control means which operates in such a manner that if there is no access to the above storage device for a given period of time or longer, the device is shifted from the active state to an idle state, if there is yet no access to the above storage device for a given period of time or longer, the device is shifted to the standby state, and if there is still yet no access to the above storage device for a given period of time or longer, the device is shifted to a sleep state, to thus gradually reduce the power consumption, and if there is an access, the device is shifted to the active state. In this case, for example, if the device is shifted from the sleep state to the active state, a motor that rotates the disk is started so that a large start current flows. In the case where the start current is supplied from a battery which is a power supply, in order to start the motor stably and at a high speed, it is necessary to select the battery of a current capacity which enables the supply of the start current.

Therefore, there has been proposed an information device having a power saving mode changing means shown in FIG. 7. In this case, the information device includes a processor (CPU) 71, a read only memory (ROM) 72, a dynamic random access memory (DRAM) 73 and a floppy disk device (FDD) 74 as a large-capacity storage device. The information device further includes an operation mode control circuit 76 for controlling those operation modes and a motor current detecting circuit 75 for detecting the current of a spindle motor of the floppy disk device 74. FIG. 7 shows the outline of a control path of the operation mode control circuit 76.

Upon reception of a spindle motor start command to the floppy disk device 74 from the processor 71, the operation mode control circuit 76 stops the clock signal of the processor 71 and sets the dynamic random access memory 73 to a self-refresh mode, and thereafter sends a spindle motor start signal to the floppy disk device 74.

In this case, most of the power consumption results from the spindle motor of the floppy disk device 74. Then, the spindle motor starts, and a current that flows in the spindle motor is detected by the motor current detecting circuit 75 and notified to the operation mode control circuit 76. The operation mode control circuit 76 starts to supply a clock signal to the processor 71 when the current that flows in the spindle motor is lowered to a set value or less, or after a set time elapses from the start of the spindle motor, and also returns the operation of the dynamic random access memory 73 to an original operation and sets the operation to the normal power mode. As a result, the peak of the current as a whole can be reduced (for example, refer to Japanese Patent Application Laid-Open No. 1996-221147).

In the case where the information device is of the portable type, the operation power supply is made up of a battery. In this case, as described above, the peak current supplied from the battery is suppressed so that a battery small in current capacity is applicable, as a result of which the battery can be downsized and lightened in weight. Alternatively, the applicable duration of the battery can be elongated. In order to conduct the power saving control, in the case where there is provided means for detecting the current of the spindle motor as in the above-mentioned conventional example, it is necessary to add a hardware such as a resistor as the current detecting means or a voltage detecting means for detecting a voltage between both ends of the resistor, resulting in such problems in that the mounting area increases and the costs increase. In addition, since the capacity or the like of the spindle motor is different for each of the kinds of information devices, it is necessary to change the current set value in accordance with the kind of the spindle motor. Thus, the means for suppressing the peak power leads to an increase in additional circuits, to thereby increase the costs.

In a magnetic disk device, a magneto-optical disk device or the like as the large-capacity storage device, in general, the start command of the spindle motor is generated not from a processor but from a firmware such as a magnetic disk device. In other words, a command for starting or stopping the spindle motor is generated by the firmware in accordance with an access request of the data read/write from the processor. The above-described conventional power saving control means of the information device with the floppy disk device cannot be applied to the above general structure.

SUMMARY OF THE INVENTION

An object of the present invention is to enable power saving control simply and surely without requiring an additional part by detection of the peak power generation condition in the information device.

As will be described with reference to FIG. 1, according to the present invention, there is provided an information device having a power supply means to a plurality of components 1 and 2, the information device comprising: access monitoring means 5 for monitoring access information to a predetermined single or plurality of predetermined components 2 to detect the peak power generation condition and the peak power completion condition of the components 2; and power mode changing means 4 for changing over a power mode to the predetermined single or plurality of predetermined components 1 from a normal power mode to a power saving mode in accordance with the detected information of the peak power generation condition by the access monitoring means 5 and for changing over the power mode from the power saving mode to the normal power mode in accordance with the detected information of the peak power completion condition.

A second aspect of the present invention provides an information device according to the first aspect, but further configured such that when the components 2 constitute the information storage device such as a magnetic disk device, the access monitoring means 5 detects the status issue of read/write indicative of the spin-up generation of the information storage device as the peak power generation condition and detects the status issue of read/write completion as the peak power completion condition.

Further, the power mode changing means 4 changes over the components 1 such as the processor from the normal power mode to the power saving mode upon detection of the peak power generation condition, and changes over the components 1 from the power saving mode to the normal power mode upon the subsequent detection of the peak power completion condition.

In another aspect, the information device is as according to the first aspect, but further characterized in that the power mode changing means changes over a processor and a liquid crystal panel having a back light as the components from the normal power mode to the power saving mode by the detection of the peak power generation condition of the information storage device as the component by the access monitoring means, and changes over the processor and the liquid crystal panel from the power saving mode to the normal power mode by the detection of the peak power completion condition.

An information device in yet another aspect of the invention is as according to the first aspect, but further characterized in that the access monitoring means obtains the application ratio of the processor, detects the access information as the peak power generation condition when the application ratio exceeds a set value, and detects the access information as the peak power completion condition when the application ratio is lower than the set value.

Further, according to the present invention, there is provided a power saving mode switching method comprising the steps of: monitoring access information to a predetermined single or plurality of predetermined components 2; detecting the peak power generation condition and the peak power completion condition of the components 2 in accordance with the access information; changing over a power mode to other components 1 such as a processor from a normal power mode to a power saving mode upon the detection of the peak power generation condition; and changing over the power mode from the power saving mode to the normal power mode upon the subsequent detection of the peak power completion condition. Further, the power saving mode switching method comprises the steps of: detecting the status issue of read/write indicative of the spin-up generation of the information storage device as the peak power generation condition with the components 2 as the information storage device such as a magnetic disk device; changing over other components such as a processor from the normal power mode to the power saving mode; detecting the subsequent status issue of read/write completion as the peak power completion condition; and changing over the other components such as the processor from the power saving mode to the normal power mode.

The power saving mode switching method in a further aspect of the invention is according to the foregoing, and further characterized by comprising the steps of: changing over a processor and a liquid crystal panel having a back light as other components from the normal power mode to the power saving mode by the detection of the peak power generation condition of the information storage device as the component, and changing over the processor and the liquid crystal panel from the power saving mode to the normal power mode by the subsequent detection of the peak power completion condition.

Further, according to the present invention, there is provided a recording medium such as a magnetic disk, an optical disk or a semiconductor memory for storing a power saving mode switching program, comprises the steps of: monitoring access information to a predetermined single or plurality of predetermined components 2; detecting the peak power generation condition and the peak power completion condition of the components 2 in accordance with the access information; changing over a power mode to other components 1 from a normal power mode to a power saving mode upon the detection of the peak power generation condition; and changing over the power mode from the power saving mode to the normal power mode upon the detection of the peak power completion condition.

In a further aspect of the invention, the recording medium for storing a power saving mode switching program of the information device having an information storage device and a processor is as in the foregoing, but further characterized by comprising the steps of: detecting the status issue of read/write indicative of the spin-up generation of the information storage device as the peak power generation condition; changing over the processor from the normal power mode to the power saving mode; detecting the subsequent status issue of read/write completion as the peak power completion condition; and changing over the processor from the power saving mode to the normal power mode.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Figure 1:
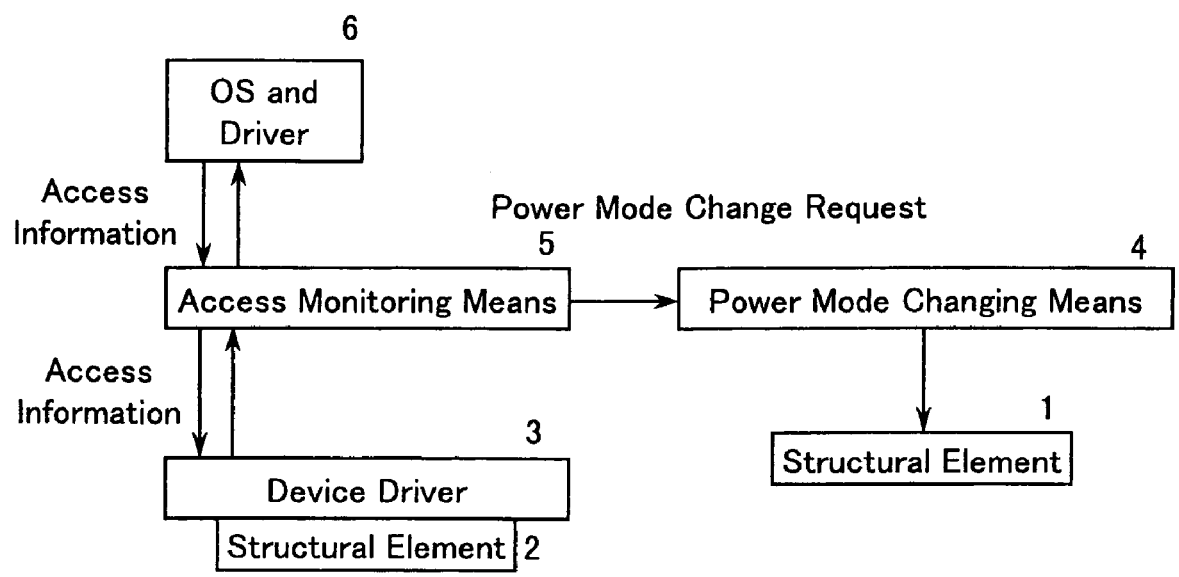
FIG. 1 is an explanatory diagram showing an embodiment of the present invention.

FIG. 1 is an explanatory diagram showing an embodiment of the present invention, and shows the main functional portion of an information device, in which reference numeral 1 denotes a component such as a processor, 2 is a component which is a peak power generation factor of an information storage device such as a magnetic disk device, 3 is a device driver of the component 2, 4 is a power mode changing means, 5 is an access monitoring means, and 6 is an OS and driver.

The access monitoring means 5 monitors the access information to the component 2 through the device driver 3 from the OS and driver 6. In the case the component 2 is, for example, the information storage device such as a magnetic disk device, because the device is shifted from a standby state to an active state by the status issue of data read/write, the spin-up operation that starts a spindle motor is conducted under the control by a firmware of the information storage device through the device driver 3. In this case, since a large start current flows, it is judged that the condition is a peak power generation condition, and a power mode change request is conducted on the power mode changing means 4.

The power mode changing means 4 changes over the mode to the power saving mode where the operating voltage of the component 1 such as a processor is reduced, the frequency of the operating clock signal is reduced or the like in accordance with the power mode change request. Accordingly, since the power consumption in the component 1 is reduced, even if the power consumption in the component 2 is increased, an increase of the power consumption can be suppressed as a whole. That is, the peak current can be reduced.

Then, the access monitoring means 5 continues to monitor the access information to the component 2 and conducts the power mode change request to the power mode changing means 4, for example, if recognizing the status of the data read/write completion. The power mode changing means 4 conducts the control of changing over from the power saving mode to the normal power mode. Therefore, if the peak power is suppressed, a small-size battery can be used as a power supply, or in the case where the same battery is used, the applicable duration of the battery can be elongated.

Figure 2:
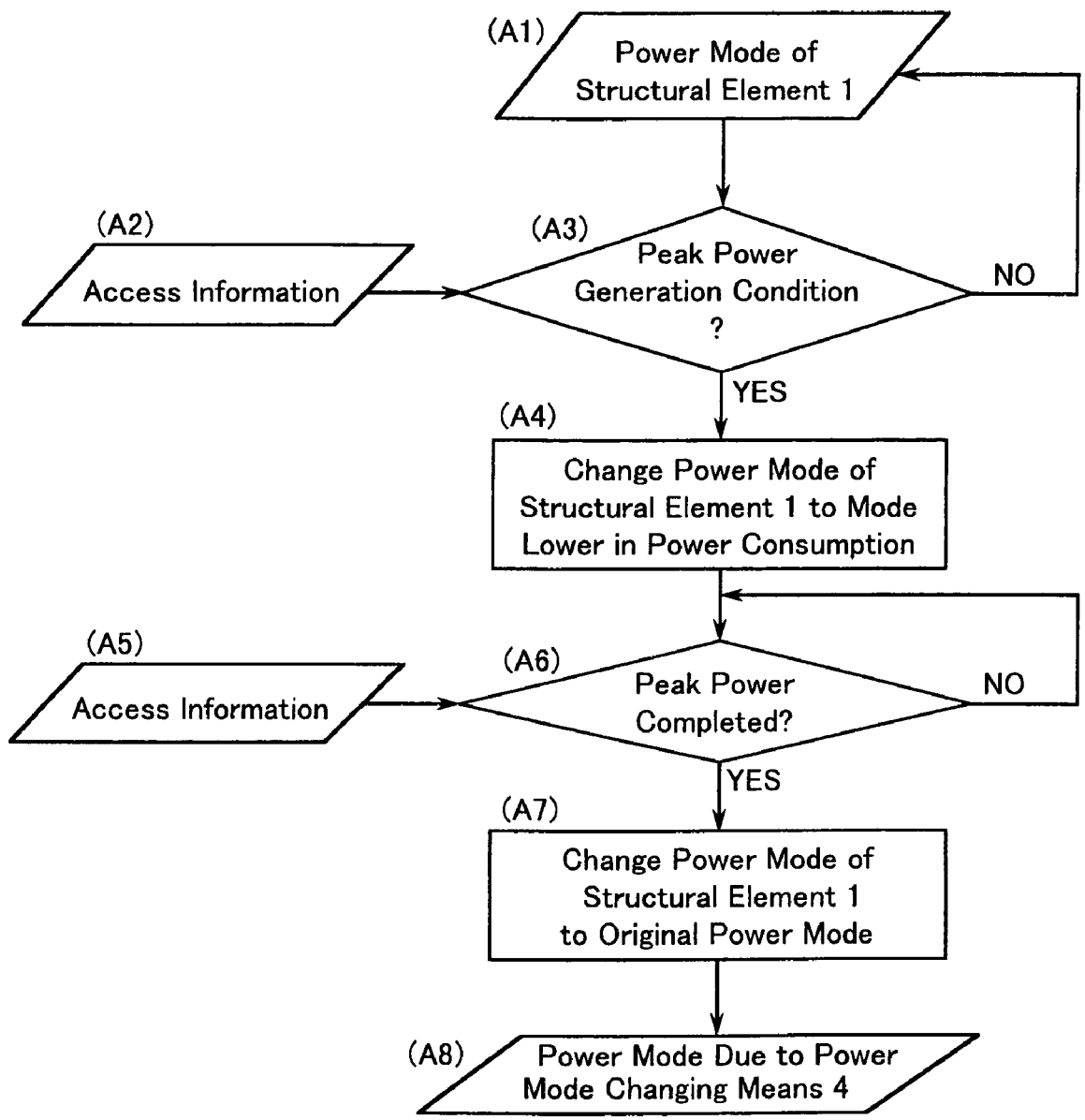
FIG. 2 is a flowchart showing an embodiment of the present invention.

FIG. 2 shows a flowchart of an embodiment of the present invention. In a power mode state of the component 1 such as a processor of the normal power mode (A1), it is judged whether the access information (A2) to the component 2 is the peak power generation condition or not (A3), and if it is not the peak power generation condition, the control is shifted to the step (A1) whereas if it is the peak power generation condition, the control is shifted to a step (A4).

In the step (A4), the power mode of the component 1 is changed to a mode where the power consumption is lower due to a reduction of the operating voltage, a reduction in the clock frequency or the like (A5). Thereafter, it is judged whether the access information (A5) is the peak power completion condition or not (A6), and only in a case where the access information is indicative of the completion of the peak power, the power mode of the component 1 is changed to the original power mode (A7), and the device operates as the normal power mode due to the power mode changing means 5 (A8).

Figure 3:
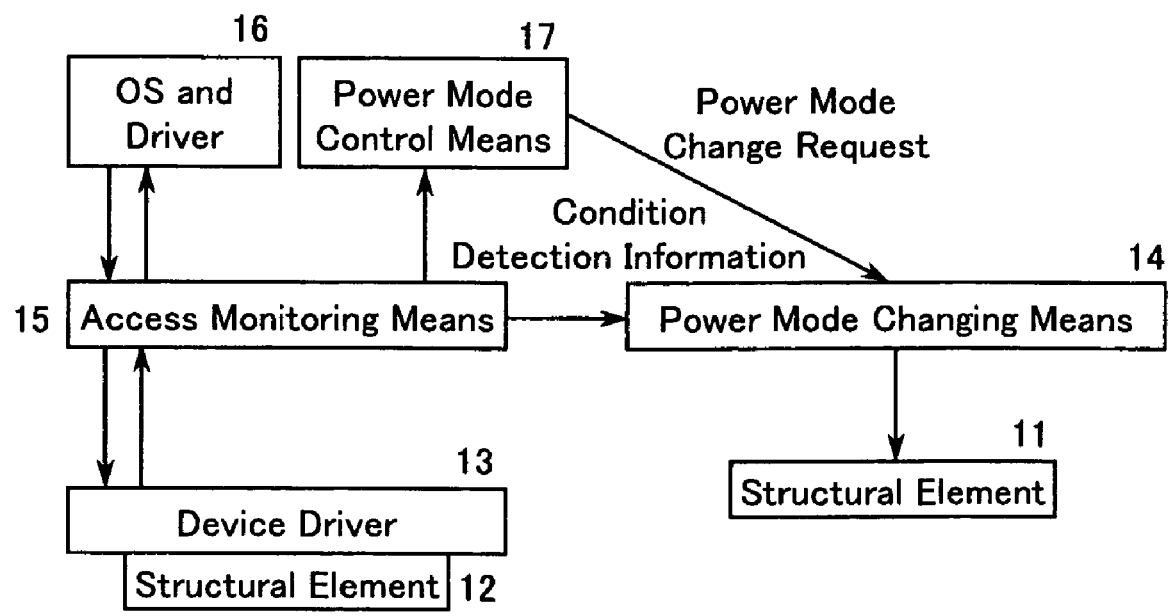
FIG. 3 is an explanatory diagram showing another embodiment of the present invention.

FIG. 3 is an explanatory diagram showing another embodiment of the present invention, in which reference numeral 11 denotes a component such as a processor, 12 is a component corresponding to the information storage device such as a magnetic disk device, 13 is a device driver, 14 is a power mode changing means, 15 is an access monitoring means, 16 is an OS and driver, and 17 is a power mode control means.

As in the above-mentioned embodiment, the access monitoring means 15 monitors the access information to the component 12 through the device driver 13 from the OS and driver 16. In the case where the component 12 is, for example, a magnetic disk device, if the device is shifted from the standby state to the active state upon the detection of the status issue of data read/write, a spindle motor is started under the control by the device driver 13, and the spin-up operation in this situation makes a large start current flow. Accordingly, in this case, it is judged that the access information is the peak power generation condition, and the detection condition information is sent to the power mode control means 17.

The power mode control means 17 sends the power mode change request to the power mode changing means 14 in accordance with the condition detection information indicative of the peak power generation condition. As a result, the power mode changing means 14 changes over the mode to the power saving mode for reducing the power consumption where the operating voltage of the component 11 such as a processor is reduced, the frequency of the operating clock signal is reduced or the like. Accordingly, since the power consumption in the component 11 is reduced, even if the power consumption in the component 12 is increased, an increase of the power consumption can be suppressed as a whole. That is, the peak current can be reduced.

In FIGS. 1 and 3, the components 1 and 11 that change the power mode can be made up of not only a single component but also plural kinds of components. Similarly, the components 2 and 12 that detect the peak power generation condition by the access monitoring means can be made up of not only a single component but also plural kinds of components.

Figure 4:
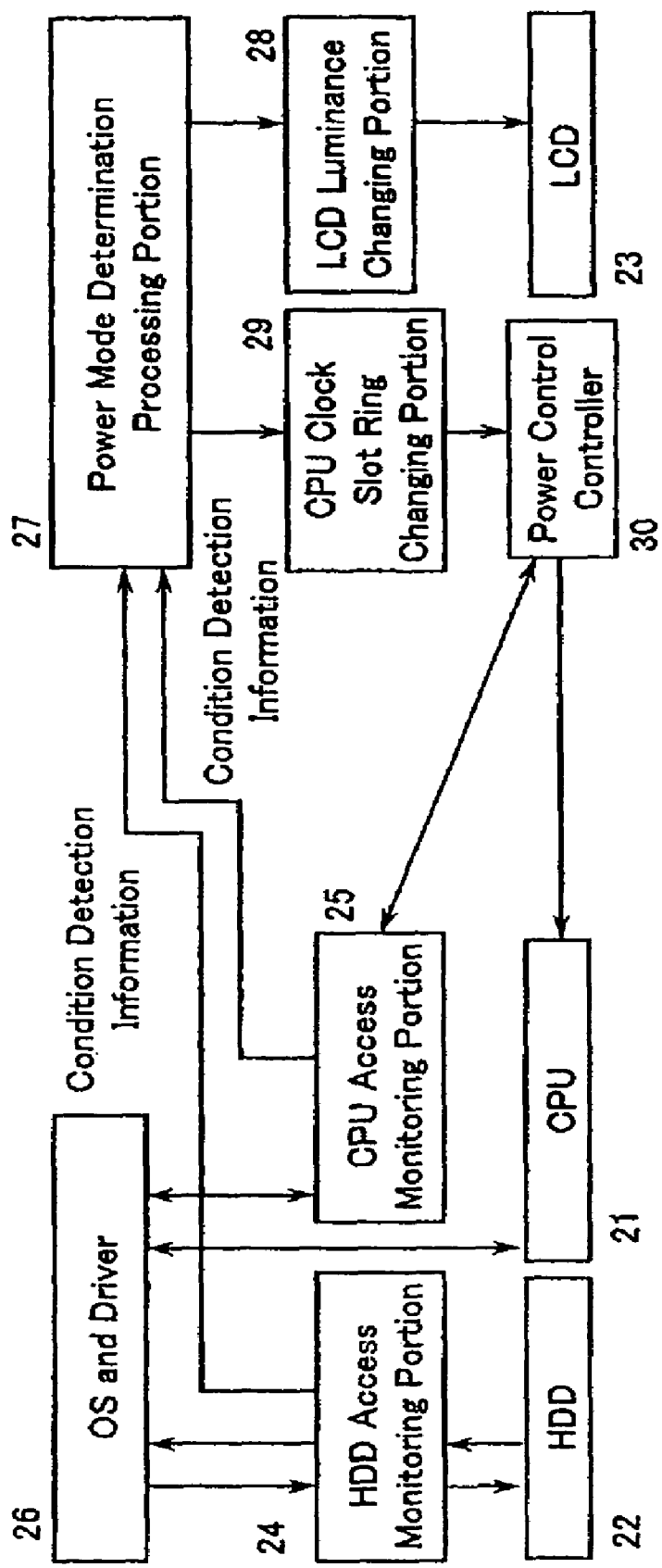
FIG. 4 is an explanatory diagram showing still another embodiment of the present invention.

FIG. 4 is an explanatory diagram showing still another embodiment in accordance with the present invention, in which reference numeral 21 denotes a processor (CPU) which is one of structure elements, 22 is a magnetic disk device (HDD) which is one of components, 23 is a liquid crystal panel (LCD) including a back light which is one of components, 24 is an HDD access monitoring portion that monitors an access to the magnetic disk device, 25 is a CPU access monitoring portion that monitors an access to the processor, 26 is an OS and driver, 27 is a power mode determination processing portion, 28 is an LCD luminance changing portion that conducts the change control of the luminance of the liquid crystal panel, 29 is a CPU clock slot ring changing portion that conducts the change control of the clock of the processor, and 30 is a power control controller.

The HDD access monitoring portion 24 for the magnetic disk device 22 has the function corresponding to the access monitoring means 5 and 15 shown in FIGS. 1 and 3. Further, the power mode determination processing portion 27, the LCD luminance changing portion 28, the CPU clock slot ring changing portion 29 and the power control controller 30 have the function corresponding to the power mode changing means 4, 14 and the power mode control means 17 shown in FIGS. 1 and 3.

Further, the liquid crystal panel 23 is designed to display an image, character and the like as the display portion of the information device, and includes a back light such as a cold cathode emission tube for lighting a panel from a side surface or a back surface. The back light excites a phosphor due to a high frequency discharge to emit light, and it is general that the power consumption is about several W or less. In order to reduce the power consumption of the back light, the supply voltage is reduced or the frequency is reduced, or the like, and the luminance is deteriorated due to the power saving mode.

Moreover, the HDD access monitoring portion 24 monitors the command of data read/write or the status of read/write completion with respect to the magnetic disk device 22 and detects the peak power generation condition, the peak power completion condition or the like. In other words, the HDD access monitoring portion 24 monitors an IO packet to the device driver of the magnetic disk device 22 from the OS and driver 26, identifies a spin down request IO packet, a read/write request IO packet, a completion IO packet and the like, and judges that the read/write request IO packet issued after the issue of the spin down request IO packet is the peak power generation condition. Further, the HDD access monitoring portion 24 judges that the completion IO packet after the issue of the read/write request IO packet is the peak power completion condition. When those conditions are detected, the HDD access monitoring portion 24 notifies the power mode determination processing portion 27 of those conditions as the condition detection information.

Furthermore, the CPU access monitoring portion 25 monitors an access to the processor 21 and detects whether the access information is the peak power generation condition or the peak power completion condition. For example, the CPU access monitoring portion 25 finds the application ratio of the processor 21 by using an API (application programming interface) of the OS and driver 26, and judges as the peak power generation condition, for example, if the application ratio of the processor 21 exceeds 50% when the clock slot ring setting by the power control controller 30 is 100%. Thereafter, the CPU access monitoring portion 25 judges as the peak power completion condition where the application ratio is 50% or less. When those conditions are detected, the CPU access monitoring portion 25 notifies the power mode determination processing portion 27 of those conditions as the condition detection information.

In addition, the power control controller 30 is provided as the function of chip set, and the CPU clock slot ring changing portion 29 changes the setting of the clock slot ring set IO register. Assuming that the clock slot ring setting is 100% in case of the normal power mode, the clock slot ring setting is changed to 50% in case of the power saving mode. Further, the LCD luminance changing portion 28 changes the power mode of the liquid crystal panel 23 under the control by the power mode determination processing portion 27. For example, the supply voltage or the frequency in assuming that the luminance in case of the normal power mode is 100% is reduced in case of the power saving mode so that the luminance is 50%.

Figure 5:
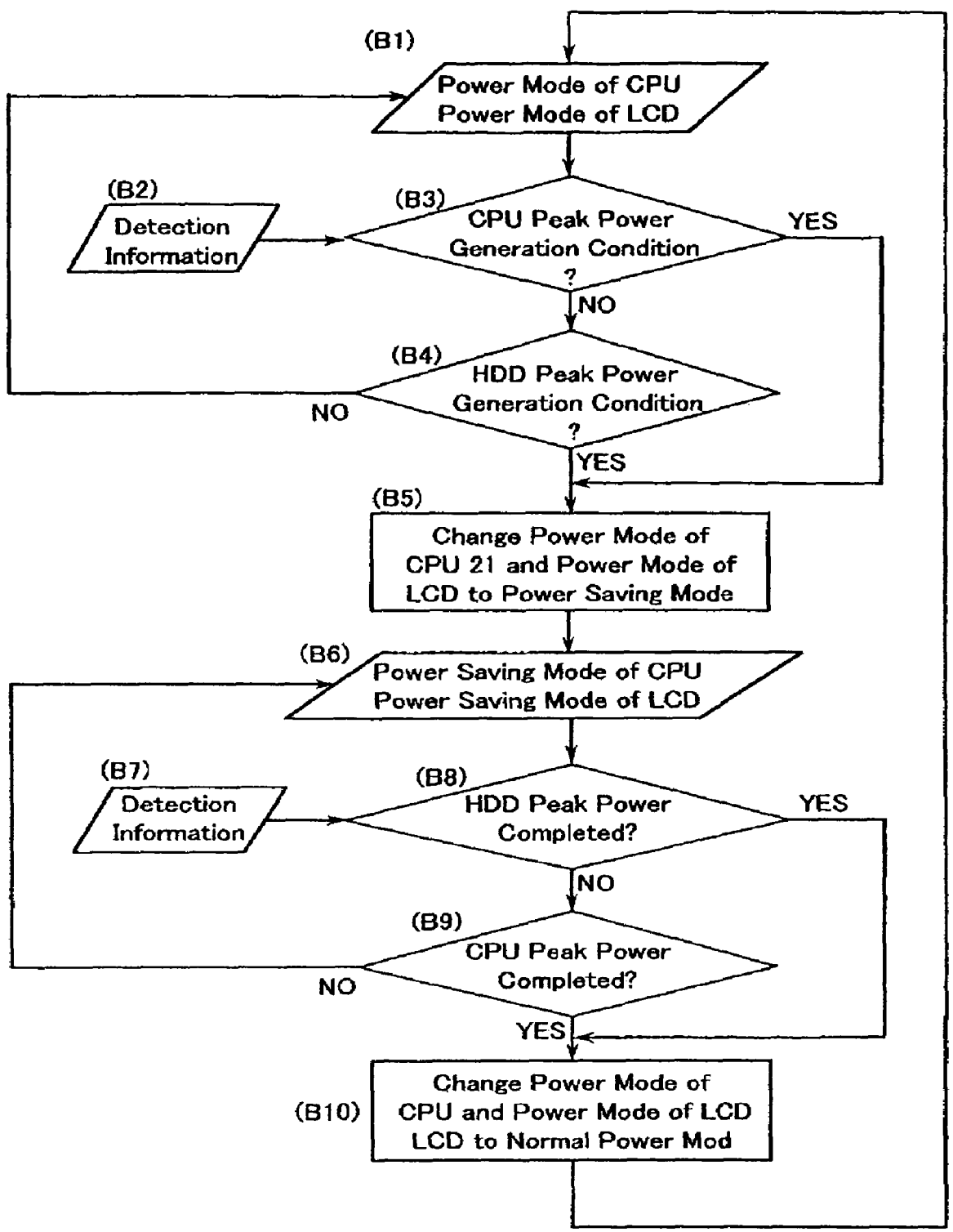
FIG. 5 is a flowchart showing still another embodiment of the present invention.
Figure 6:
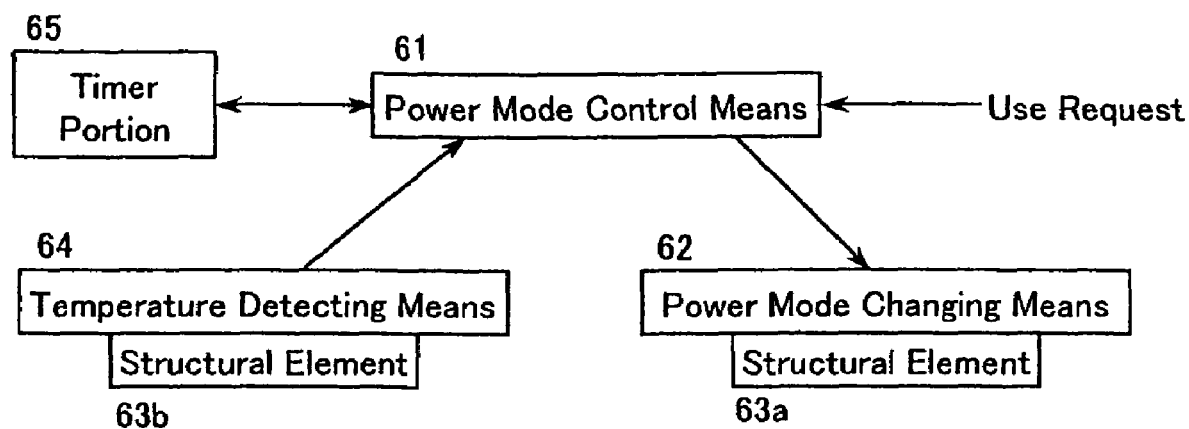
FIG. 6 is a schematic functional block diagram showing a conventional example.
Figure 7:
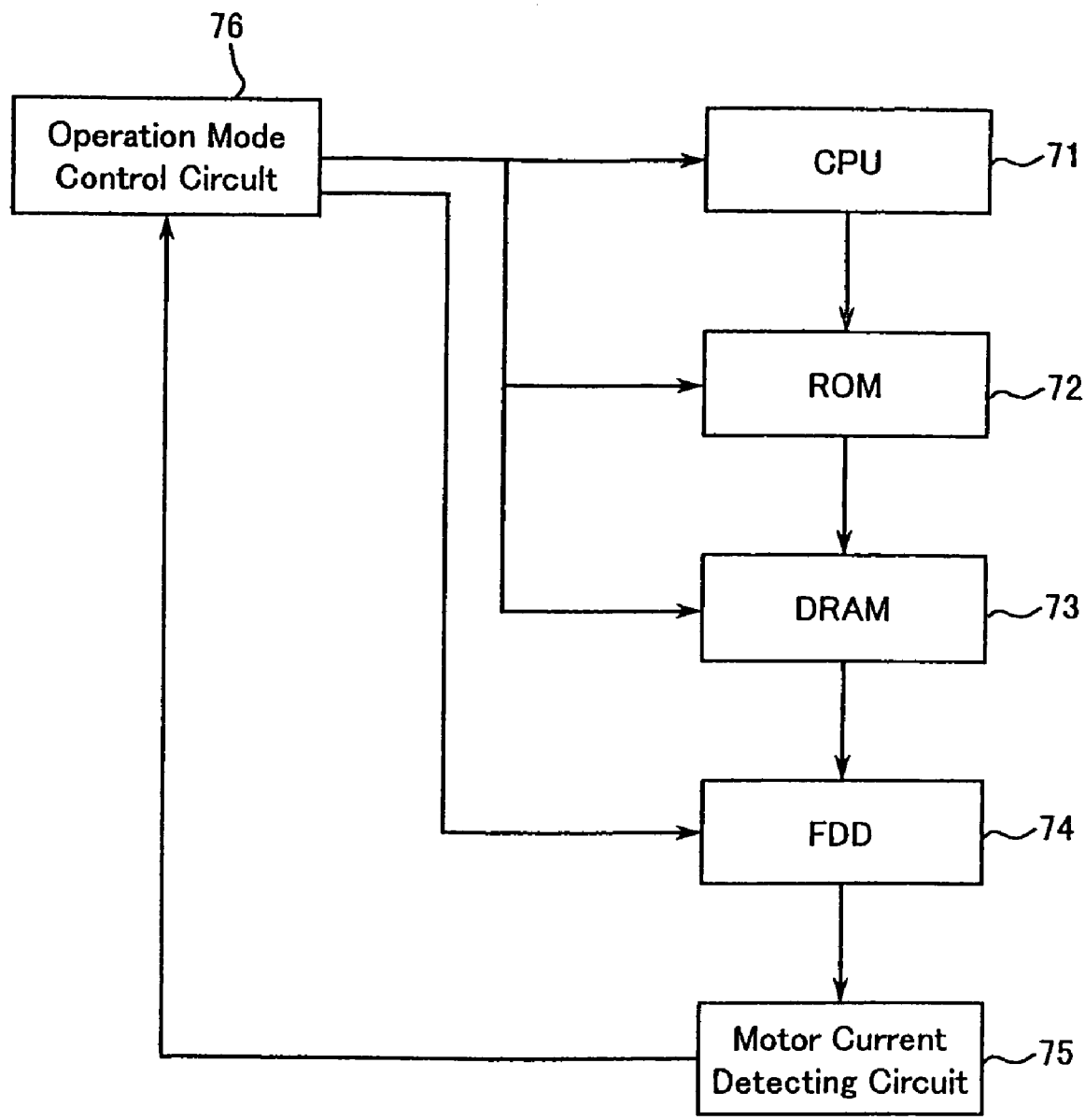
FIG. 7 is an explanatory diagram showing an information device having a power saving mode changing means in the conventional example.

FIG. 5 shows a flowchart showing still another embodiment of the present invention, and processing steps will be described with reference to FIG. 4. When the power mode of the processor (CPU) 21 and the power mode of the liquid crystal panel (LCD) 23 are set to the normal power mode (B1), if the condition detection information (B2) from the HDD access monitoring potion 24 or the CPU access detecting portion 25 is inputted to the power mode determination processing portion 27, it is judged whether the condition detection information is the peak power generation condition of the processor (CPU) or not (B3), and it is judged whether the condition detection information is the peak power generation condition of the magnetic disk device (HDD) or not (B4). If the condition detection information is not the peak power generation condition in both the cases, the control is shifted to the step (B1).

Further, in case of the peak power generation condition, the power modes of the processor (CPU) 21 and the liquid crystal panel (LCD) 23 are changed to the power saving mode (B5) as the power saving mode due to reduction in the operating voltage of the processor (CPU) 21 and in the clock frequency, and as the power saving mode due to reduction in the operating voltage of the back light of the liquid crystal panel (LCD) 23 and in the frequency (B6).

Then, if the condition detection information (B7) from the HDD access monitoring potion 24 or the CPU access detecting portion 25 is inputted to the power mode determination processing portion 27, it is judged whether the condition detection information is the peak power completion condition of the magnetic disk device (HDD) 22 or not (B8), and it is judged whether the condition detection information is the peak power completion condition of the processor (CPU) 21 or not (B9). If the condition detection information is not the peak power completion condition in both the cases, the control is shifted to the step (B6).

Further, in the case where the condition detection information is indicative of the peak power completion, the power modes of the processor (CPU) 21 and the liquid crystal panel (LCD) 23 are changed from the power saving mode to the normal power mode (B10), and the operation due to the normal power mode is conducted as the normal operation voltage and the normal clock frequency.

For example, it is assumed that the power consumption is 5 W in the normal 100% clock slot ring operation (full operating time) of the processor 21, 3 W in the 50% duty clock slot ring operation (full operating time), 1 W in the standby state, 4 W in the spin-up time of the magnetic disk device 22, 1 W in the normal access operation, 3 W in the normal operation of the liquid crystal panel 23 including the back light and 2 W in the low power consumption mode. Then, in the case where the processor 21 operates at the clock slot ring of 100%, the magnetic disk device 22 operates in the normal mode, and the liquid crystal panel 23 operates in the normal mode, the power consumption becomes (5+1+3) W. Then, at the spin-up time of the magnetic disk device 22, if the power saving control is not conducted, the power consumption becomes (5+4+3) W, and the peak power of 3 W is generated.

However, according to the above-mentioned embodiments of the present invention, if the processor 21 is changed over to the power saving mode due to the clock slot ring of, for example, 50% duty, and the liquid crystal panel 23 is changed over to the power saving mode, the power consumption becomes (3+4+2) W. Accordingly, if the processor 21 is changed over to the power saving mode due to the peak power generation condition, the generation of the peak power can be suppressed.

Usually, in the case where the processor 21 is in the standby state, the magnetic disk device 22 operates in the normal mode, and the liquid crystal panel 23 operates in the normal mode, the power consumption becomes (1+1+3) W. Then, when the processor 21 fully operates, if the power saving control is not conducted, the power consumption becomes (5+1+4) W, to thereby generate the peak power of 4 W. On the contrary, according to the above-mentioned embodiments of the present invention, if the processor 21 is changed over to the power saving mode due to the clock slot ring of 50% duty and the liquid crystal panel 23 is changed over to the power saving mode, the power consumption becomes (3+1+2) W. Accordingly, the peak power can be suppressed to 1 W by changing over the mode to the power saving mode due to the peak power generation condition. That is, the peak current can be suppressed and the battery can be downsized as the power supply.

In the processor 21, the detection of the above-mentioned peak power generation condition can be made (a) in the case where the application ratio of the processor 21 exceeds the threshold value (for example, 50%), (b) in the case where a brake event occurs after the idle state of the processor 21 is issued in the BIOS (Basic Input/Output System) from the OS, and (c) in the case where the power state change of the processor 21 is monitored, and the power state is changed to the full operating state. As the application ratio of (a), there are the monitor of the API of the OS, the monitor of space sled of the OS, the monitor of the power state of the processor 21 which is written in the register of the chip set including the power control controller 30, and the like.

In the magnetic disk device 22, it can be judged that the access information is the peak power generation condition (d) when the IO packet between the drivers of the file system is monitored, and the IO packet of a read/write request is issued after the IO packet of the spin down request is issued, (e) when the IO access is monitored, and the status of the first read/write request is issued after the standby or the sleep status is issued from the interface of the magnetic disk device 22, or the like. Further, in the external interface portion such a modem, the power state and the IO access are monitored, and the IO access in the sleep or idle state can be judged as the peak power generation condition.

Also, in the processor 21, the detection of the peak power completion condition can be made (f) in the case where the application ratio of the processor 21 is lowered to less than the threshold value (for example, 50%), (g) in the case where the idle of the processor 21 is issued in the BIOS from the OS, (h) in the case where the power state of the processor 21 is monitored, and the power state is changed to the sleep state, (i) in the case where a fault command is issued from the processor 21, and the like.

In the magnetic disk device 22, it can be judged that the access information is the peak power completion condition (j) when the IO packet between the drivers of the file system is monitored, and the IO packet of a read/write completion to the IO packet of the read/write request is issued after the IO packet of the spin down request is issued, (h) when the status of the first read/write completion is recognized due to the status register after the status of the first read/write is issued after the issue of the command of the standby or the sleep from the interface of the magnetic disk device 22, and the like. Further, in the external interface portion such as a modem, the power state and the IO access are monitored, and when the device state is shifted to the power saving mode and when the IO access frequency is lowered, it can be judged as the peak power completion condition.

As was described above, according to the present invention, the peak power generation condition due to the spin-up time or the full operating time of the processor resulting from an access to the information storage device in the structure in which the information device, in particular, the portable information device such as a notebook personal computer, which is equipped with the information storage device such as a magnetic disk device, is detected by the monitor of a command, and the normal power mode is changed over to the power saving mode, thereby being capable of suppressing the peak current. Therefore, in the case where a battery is used as the power supply, the relatively small-sized battery can be used, and the applicable duration of the battery can be elongated. Further, since an area where the information device is mounted is not increased, the power saving control can be made without increasing the costs. In addition, since the recording medium in which the power saving mode switching program is stored is set to an existing information device, and the program is installed therein, the generation of the peak power can be suppressed as described above.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An information device having means for supplying power to a plurality of its components including an OS and driver, and a device driver, the information device characterized by comprising:

access monitoring means for monitoring IO packets from a predetermined single one or a number of said components, and for detecting peak-power generating condition and peak-power terminating condition for the components; and power-mode changing means for switching mode of power, to the predetermined single one or number of said components, from a normal-power mode to a power-saving mode according to detected information from said access monitoring means on said peak-power generating condition, and for switching the power mode from said power-saving mode to said normal-power mode according to detected information from said access monitoring means on said peak-power terminating condition, wherein said access monitoring means monitors said IO packets between said OS and driver, and said device driver, wherein said predetermined single one or a number of said components is an information storage device, said access monitoring means is configured for:

detecting issuance of a read/write request IO packet indicating occurrence of spin-up in the information storage device as the peak-power generating condition; and detecting issuance of a read/write completion IO packet as the peak-power terminating condition.

2. An information device having means for supplying power to a plurality of its components including an OS and driver, and a device driver, the information device characterized by comprising:

access monitoring means for monitoring IO packets from a predetermined single one or a number of said components, and for detecting peak-power generating condition and peak-power terminating condition for the components; and power-mode changing means for switching mode of power, to the predetermined single one or number of said components, from a normal-power mode to a power-saving mode according to detected information from said access monitoring means on said peak-power generating condition, and for switching the power mode from said power-saving mode to said normal-power mode according to detected information from said access monitoring means on said peak-power terminating condition, wherein said access monitoring means monitors said IO packets between said OS and driver, and said device driver, wherein said predetermined single one or a number of said components is an information storage device, and other of said components are a processor and a liquid-crystal panel having a back light, said power-mode changing means is configured for:

switching said processor and said liquid crystal panel from the normal-power mode to the power-saving mode, according to detection, by said access monitoring means, of the peak-power generating condition in said information storage device; and switching said processor and said liquid crystal panel from the power-saving mode to the normal-power mode according to detection, by said access monitoring means, of the peak-power terminating condition.

3. A power-saving-mode switching method for an information device having a plurality of components including an information storage device, a processor, an OS and driver, and a device driver, the power-saving-mode switching method characterized by including the steps of:

monitoring IO packets from a predetermined single one or a number of said components;

detecting peak-power generating condition and peak-power terminating condition for the predetermined single one or number of said components according to the IO packets;

switching mode of power to other of said components from a normal-power mode to a power-saving mode according to detection of the peak-power generating condition;

switching the power mode from the power-saving mode to the normal-power mode according to subsequent detection of peak-power terminating condition, detecting issuance of a read/write request IO packet indicating occurrence of spin-up in said information storage device as the peak-power generating condition, and switching said processor from the normal-power mode to the power-saving mode; and detecting subsequent issuance of a read/write completion IO packet as the peak-power terminating condition, and switching said processor from the power-saving mode to the normal-power mode, wherein said monitoring step monitors IO packets between said OS and driver, and said device driver.

4. A recording medium on which is stored a power-saving-mode switching program for an information device having a plurality of components including an information storage devices, a processor, an OS and driver, and a device driver, the power-saving-mode switching program stored on the recording medium characterized by including:

a step of monitoring IO packets from a predetermined single one or a number of said components;

a step of detecting peak-power generating condition and peak-power terminating condition for the predetermined single one or number of said components according to the IO packets;

a step of switching mode of power to other of said components from a normal-power mode to a power-saving mode according to detection of the peak-power generating condition;

a step of switching the power mode from the power-saving mode to the normal-power mode according to subsequent detection of peak-power terminating condition;

a step of detecting issuance of a read/write request IO packet indicating occurrence of spin-up in said information storage device as the peak-power generating condition, and switching said processor from the normal-power mode to the power-saving mode; and a step of detecting subsequent issuance of a read/write completion IO packet as the peak-power terminating condition, and switching said processor from the power-saving mode to the normal-power mode, wherein said monitoring step monitors IO packets between said OS and driver, and said device driver.

5. An information device having means for supplying power to a plurality of its components, the information device characterized by comprising:

access monitoring means for monitoring information on access to components which are monitored among said plurality of components, and for detecting peak-power generating condition and peak-power terminating condition for the monitored components; and power-mode changing means for switching mode of power, to components which are not monitored among said plurality of components, from a normal-power mode to a power-saving mode according to detected information from said access monitoring means on said peak-power generating condition, and for switching the power mode from said power-saving mode to said normal-power mode according to detected information from said access monitoring means on said peak-power terminating condition, wherein said access monitoring means monitors IO packets between an OS and driver, and a device driver, wherein at least one of said monitored components is an information storage device, said access monitoring means is configured for:

detecting issuance of read/write status indicating occurrence of spin-up in the information storage device as the peak-power generating condition; and detecting issuance of read/write end status as the peak-power terminating condition.

6. An information device having means for supplying power to a plurality of its components, the information device characterized by comprising:

access monitoring means for monitoring information on access to components which are monitored among said plurality of components, and for detecting peak-power generating condition and peak-power terminating condition for the monitored components; and power-mode changing means for switching mode of power, to components which are not monitored among said plurality of components, from a normal-power mode to a power-saving mode according to detected information from said access monitoring means on said peak-power generating condition, and for switching the power mode from said power-saving mode to said normal-power mode according to detected information from said access monitoring means on said peak-power terminating condition, wherein said access monitoring means monitors IO packets between an OS and driver, and a device driver, wherein at least one of said monitored components is an information storage device, and the other components, which are not monitored, are a processor and a liquid-crystal panel having a back light, said power-mode changing means is configured for:

switching said processor and said liquid crystal panel from the normal-power mode to the power-saving mode, according to detection, by said access monitoring means, of the peak-power generating condition in said information storage device; and switching said processor and said liquid crystal panel from the power-saving mode to the normal-power mode according to detection, by said access monitoring means, of the peak-power terminating condition.

7. A power-saving-mode switching method, for an information device having a plurality of components including an information storage device and a processor, the power-saving-mode switching method characterized by including the steps of:

monitoring information on access to components which are monitored among said plurality of components, detecting peak-power generating condition and peak-power terminating condition for the monitored components according to the access information;

switching mode of power to the other components which are not monitored among said plurality of components from a normal-power mode to a power-saving mode according to detection of the peak-power generating condition;

switching the power mode from the power-saving mode to the normal-power mode according to subsequent detection of peak-power terminating condition, detecting issuance of read/write status indicating occurrence of spin-up in said information storage device as the peak-power generating condition, and switching said processor from the normal-power mode to the power-saving mode; and detecting subsequent issuance of read/write end status as the peak-power terminating condition, and switching said processor from the power-saving mode to the normal-power mode, wherein monitoring information step monitors IO packets between an OS and driver, and a device driver.

8. An information device having a plurality of components, the power-saving-mode switching method characterized by including the steps of:

monitoring information on access to components which are monitored among said plurality of components, detecting peak-power generating condition and peak-power terminating condition for the monitored components according to the access information;

switching mode of power to the other components which are not monitored among said plurality of components from a normal-power mode to a power-saving mode according to detection of the peak-power generating condition; and switching the power mode from the power-saving mode to the normal-power mode according to subsequent detection of peak-power terminating condition, wherein monitoring information step monitors IO packets between an OS and driver, and a device driver, wherein said at least one said monitored components is an information storage device, and the other components, which are not monitored, are a processor and a liquid-crystal panel having a back light, characterized by further including the steps of:

switching said processor and said liquid-crystal panel from the normal-power mode to the power-saving mode, according to detection of the peak-power generating condition in said information storage device; and switching said processor and said liquid crystal panel from the power-saving mode to the normal-power mode according to subsequent detection of the peak-power terminating condition.

* * * * *